(12) United States Patent
Morovic et al.

(10) Patent No.: US 11,418,681 B1
(45) Date of Patent: Aug. 16, 2022

(54) HALFTONE MATRIX GENERATION USING KERNELS

(71) Applicant: Hewlett-Packard Development Company, L.P., Spring, TX (US)

(72) Inventors: Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/245,664

(22) Filed: Apr. 30, 2021

(51) Int. Cl.
*H04N 1/52* (2006.01)
*B41J 2/045* (2006.01)
*G06K 15/10* (2006.01)
*H04N 1/405* (2006.01)
*G06K 15/02* (2006.01)

(52) U.S. Cl.
CPC ............ *H04N 1/52* (2013.01); *B41J 2/04541* (2013.01); *G06K 15/102* (2013.01); *G06K 15/1881* (2013.01); *H04N 1/405* (2013.01)

(58) Field of Classification Search
CPC ....... H04N 1/52; H04N 1/405; B41J 2/04541; G06K 15/102; G06K 15/1881
See application file for complete search history.

(56) References Cited

U.S. PATENT DOCUMENTS 7,787,703 B2 * 8/2010 McCandlish ............. G06T 7/12
358/448
9,578,207 B1 * 2/2017 Andree ................ H04N 1/6005

\* cited by examiner

*Primary Examiner* — Quang N Vo
(74) *Attorney, Agent, or Firm* — Michael A Dryja (57) ABSTRACT

A method in described in which a halftone matrix is generated using a kernel by mapping kernel values of each pixel to a halftone matrix value at a corresponding element of the halftone matrix. Where a plurality of pixels have the same kernel value, the kernel value is randomly mapped to a respective halftone matrix value in a range of halftone matrix values corresponding to the kernel value.

15 Claims, 8 Drawing Sheets

HALFTONE MATRIX GENERATION USING KERNELS

BACKGROUND

In printing, halftoning is a process in which a discrete number of printing fluids are distributed spatially to generate a continuous-tone image.

DETAILED DESCRIPTION

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*-CIELAB or 'LAB') color space, in which three variables represent lightness (L*) and opposing color dimensions (a* and b*); the YUV color space, in which three variables represent the luminance (Y) and two chrominance dimensions (U and V); and the IPT color space, in which the three variables represent a lightness or Intensity dimension (I), a "Protanopia" red-green chroma dimension (P), and a "Tritanopia" yellow-blue chroma dimension (T).

An image to be printed may be described by image data which may comprise a number of pixels or elements of the image which are each associated with a color value in a color space. The color values of the image data may need to be converted into a different color space specific to a printing apparatus for printing the image. For example, an image defined according to an RGB color space may need to be redefined in a CMYK color space corresponding to colorants available to the printing apparatus. A specific combination of colorants or inks to be printed may be specified as an ink-vector, which corresponds to the of colorant for each pixel of an image to be printed.

A colorant may be a dye, a pigment, an ink, or a combination of these materials. A substrate may include various types of paper, including matt and gloss, cardboard, textiles, plastics and other materials.

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of a plurality of available printing fluids, such as a drop of magenta on a drop of cyan (for a bi-level printer) in a common addressable print area (e.g. a printable "pixel"). An NP may be referred to as a "pixel state".

Each NPac vector may therefore define a probability distribution for colorant or printing fluid combinations for each halftone pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing pipeline that uses area coverage representations for halftone generation is a Halftone Area Neugebauer Separation (HANS) pipeline.

Each halftone pattern corresponds to an image pixel associated with an NPac vector and comprises a plurality of halftone pixels. The NP associated with the NPac vector are distributed across the halftone pixels according to some pattern to provide the relative area coverage of NP defined by the NPac vector. In order to avoid visual artifacts such as moire, the distribution of NP across the pixels of one halftone pattern are changed compared with the distribution of NP across the pixels of adjacent halftone patterns. In an example, this is achieved by randomizing the distribution of NP across each halftone pattern.

Certain examples described herein address a challenge with printing fine lines or other features. Halftoning certain types of features, such as light, single pixel lines, is a hard problem with any halftoning approach currently available. The main challenge is that a fine feature (such as a 1 pixel line) at a low density, results in few halftone pixels containing drops to be fired. These few pixels then need to be well distributed in order for the resulting print to appear like a well-formed line.

Figure 1:
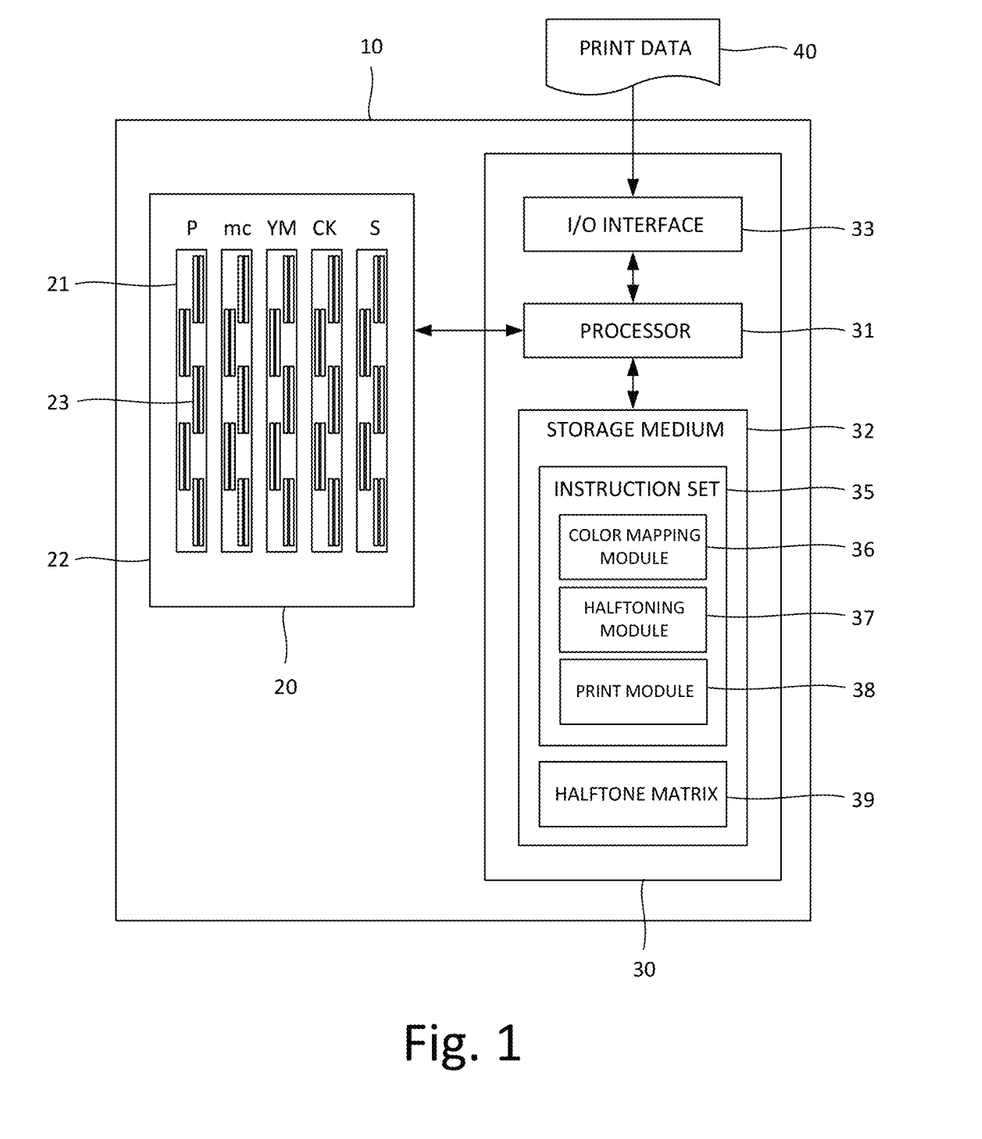
FIG. 1 shows an example printing device.

FIG. 1 shows an example of a printing device 10 comprising a carriage assembly 20 and a control unit 30.

The carriage assembly 20 comprises a set of printheads 21 carried by a carriage 22. A drive assembly (not shown) moves the carriage assembly 20 along a scan axis in response to drive signals from the control unit 30.

Each of the printheads 21 comprises a plurality of dies, with each die comprising a plurality of nozzles through which drops of printing fluid are dispensed. The printheads are fluidly coupled to fluid reservoirs (not shown), which supply printing fluids to the printheads. Each printing fluid may be a colorant or a non-colorant, such as a pre-treatment (e.g. fixer/optimizer) or post-treatment (e.g. overcoat) fluid. In the illustrated example, the printing device comprises five printheads that are supplied with eight different printing fluids: cyan (C), magenta (M), yellow (Y), black (K), light cyan (c), light magenta (m), optimizer (P) and overcoat (S).

The control unit 30 comprises a processor 31, a storage medium 32, and an input/output interface 33. The processor 31 is responsible for controlling the operation of the printing device 30 and executes an instruction set 35 stored in the storage medium 32. The instruction set 35 comprises instructions, which when executed by the processor 31, implement a color mapping module 36, a halftoning module 37, and a print module 38. In addition to the instruction set 35, the storage medium 32 stores a halftone matrix 39 for use by the halftoning module 37.

During use, the printing device 30 receives print data 40. In one example, the print data 40 may be a raster image generated by a raster image processor. The color mapping module 36 maps the colors of the print data 40 (e.g. RGB or CMYK) to the colors of the printing device 30, which in this instance is CMYKcmPS.

The color mapping module 36 may map the colors to an area coverage color space, such as the Neugebauer Primary area coverage (NPac) color space. In NPac color space, each pixel of an image is represented by an NPac vector. A Neugebauer Primary (NP) corresponds to one of the possible combinations of printing fluids at each image pixel, including the absence of any printing fluids. The total number of NPs depends on the number of printing fluids, k, and the number of drop states, D, for each printing fluid, and may be defined as $D^k$. So, for a printing device having three printing fluids (e.g. cyan, magenta and yellow) and two drop states (zero drops and one drop), the NPs are: blank, C, M, Y, CM, CY, MY and CMY. An NPac vector defines the relative area covered by each of the NPs. So, for example, an NPac vector of [magenta:0.3; cyan:0.2; blank: 0.5] implies that 30% of the area is magenta, 20% is cyan, and 50% is blank.

The halftoning module 37 uses the halftone matrix 39 stored in the storage medium 32 to convert the image data output by the color mapping module 36 into a plurality of halftone patterns, which collectively form a halftone image.

The print module 38 prints the halftone patterns onto a print medium by controlling the travel of the carriage 22 and the firing of the nozzles of the printheads 21 according to the halftone patterns. The print module 38 may print the halftone patterns in multiple printing passes and/or using multiple sets of printheads.

Figure 2:
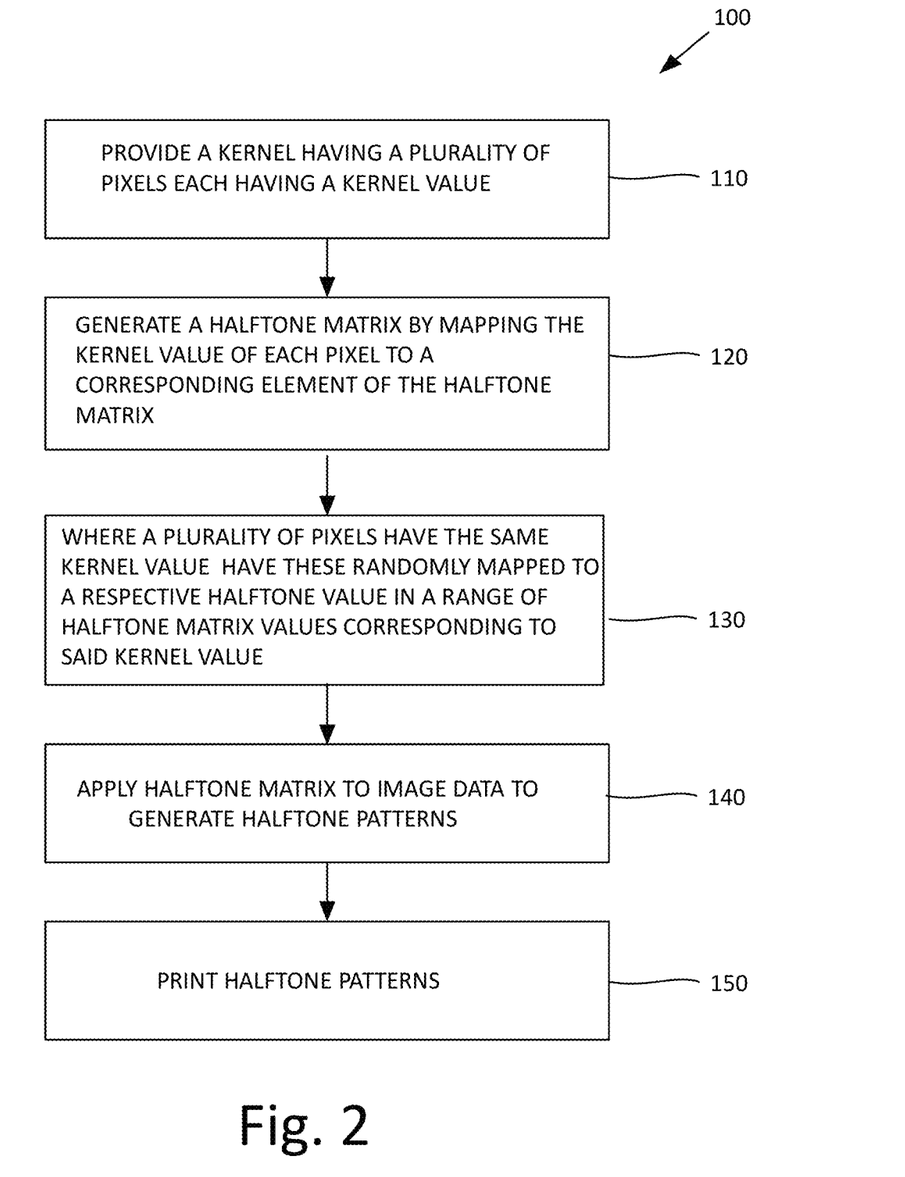
FIG. 2 shows an example method for printing image data.

FIG. 2 illustrates an example method that may be performed by the printing device of FIG. 1. Alternatively, the method may be performed partly by a computing device, and the resulting halftone patterns may be sent to a printing device for printing.

The method 100 comprises providing 110 a kernel having a plurality of pixels each having a kernel value. In this example, the starting kernel has a non-uniform distribution of values. A kernel may be a datastructure, matrix, virtual object or map defining a shape or pattern having a number of locations or pixels each of which is associated with a value of some kind, for example a tone value. A kernel may be printed or displayed to render the shape or pattern on a substrate such as paper or a display screen. A geometric kernel may be a collection of pixels having pixel values that specify an area containing curves or lines and which often has some symmetrical features and one or more groups of pixels having the same pixel value. A kernel may be generated in other ways and may not be geometric but have a non-uniform distribution of values.

The size of a kernel may be based on a number of factors such as the bit-depth of the value or intensity encoding of a printing system. For example an 8-bit depth has a possible range of tones of 0-255 (256 values). In order to get a uniform distribution of values a modified kernel could be represented by a 16×16 matrix where each value can be represented once. A reasonably uniform or flat distribution may be achieved in the same 8-bit system with for example a 20×20 matrix where each value is used once or twice.

Figure 3:
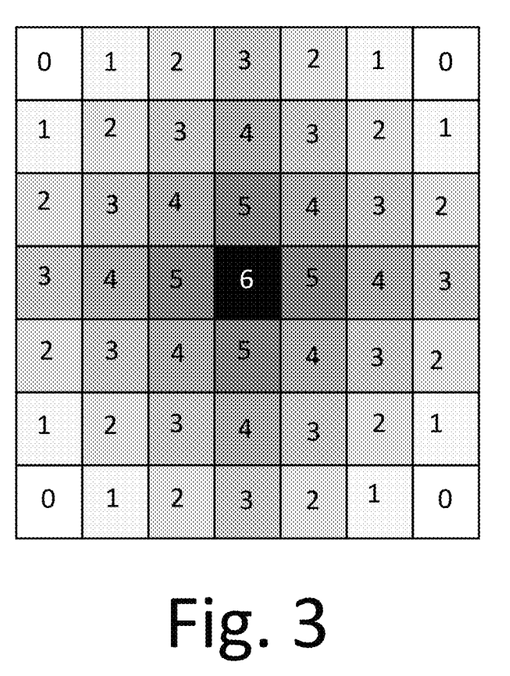
FIG. 3 shows a geometric kernel.

An example geometric kernel is illustrated in FIG. 3 and comprises a 7×7 pixel object, each pixel having a pixel value as shown. For simplicity a simple scale of 0-6 is used, however the values may be tones such as 0-255 in an 8-bit color system, or they may be normalized values such as −1 to +1. The pixels are shaded according to their values and as can be seen define a "diamond" shape which is darker at the center and lighter at the edges. Other geometric kernel shapes may be employed such as squares, dots, circles, lines, triangles, or any polygon. In color printing, the use of such geometric shapes for halftone patterns has a number of advantages, including direct control over how halftone pixels, and therefore the resulting colorant deposition on a substrate, are arranged spatially. Such spatial arrangement then impacts print properties like grain and detail, and printing system properties like robustness to perturbations or the imperfect operation of colorant deposition.

Figure 4:
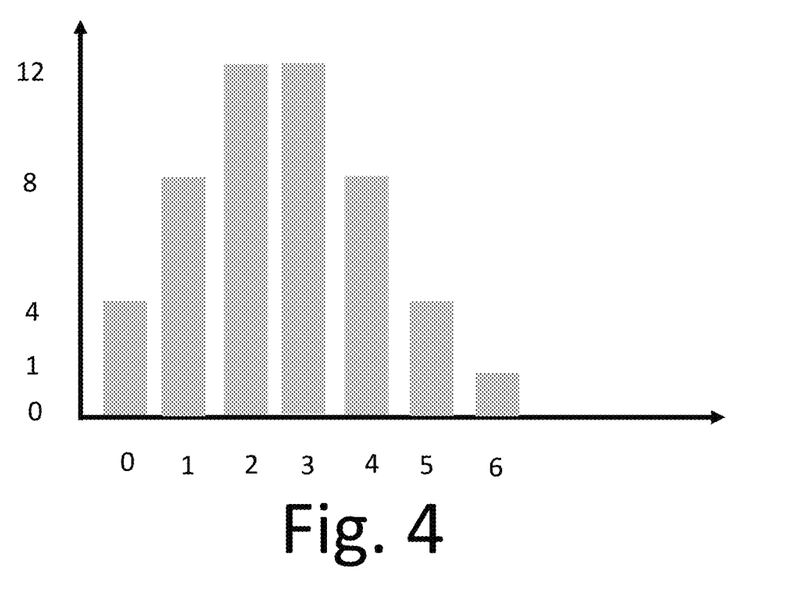
FIG. 4 illustrates a histogram of the geometric kernel of FIG. 3.

As can be seen from FIG. 3, apart from one central pixel with value 6, all other pixels have a value shred by some other pixels. FIG. 4 is a histogram of the values of the pixels in FIG. 3 and it can be seen for example that there are four pixels with each of values 0 and 5, eight pixels with each of values 1 and 4, and twelve pixels with each of values 2 and 3. This represents an uneven distribution of values across the kernel or matrix. Such kernels would not be suitable for use in PARAWACS halftoning methods as they do not have the required statistical properties, that is a uniform distribution of values; for example where each value is only allocated to one pixel and hence only used once.

Returning to FIG. 2, the method generates 120 a halftone matrix by mapping the kernel value of each pixel to corresponding element of a halftone matrix. In an example this the mapping is achieved according to magnitude of the respective values, for example the pixel having a pixel value with the largest magnitude is mapped to an element having a halftone matrix value with the largest magnitude. Alternatively, an inverse relationship may be used.

In order to achieve a uniform distribution of matrix element values, in an example the method maps 130 a plurality of pixels having the same value to halftone matrix elements having different halftone matrix values such that each halftone matrix element has a unique halftone matrix value. This may be achieved by defining a range of halftone matrix values for each kernel value. In the example kernel of FIGS. 3 and 4, the range of halftone matrix values may be a single value corresponding to kernel value 6, and a range of four halftone matrix values corresponding to kernel value 5. A simple example of implementing this is illustrated in FIGS. 5 and 6.

Figure 5:
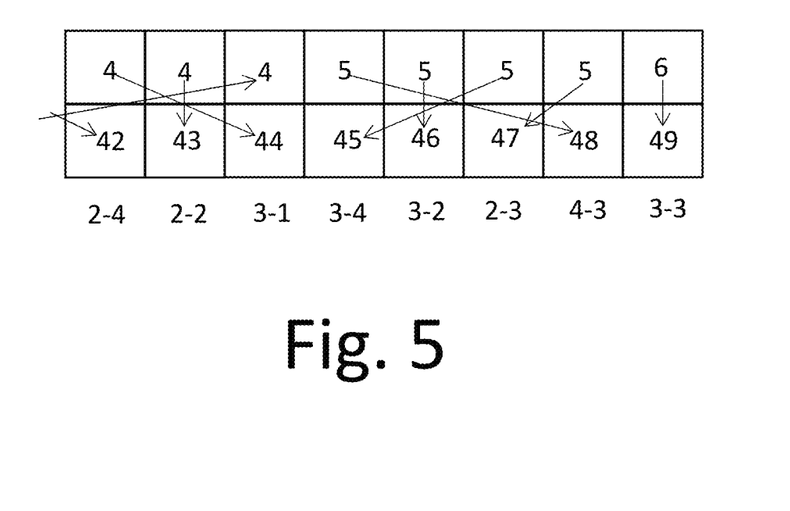
FIG. 5 illustrates mapping of kernel values to halftone matrix values.
Figure 6:
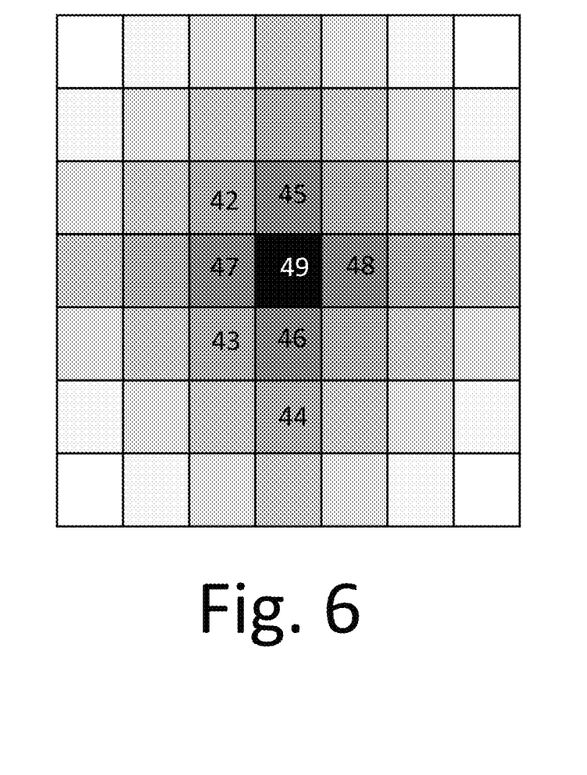
FIG. 6 shows a halftone matrix.

FIG. 5 illustrates part of a mapping between kernel values of pixels in the kernel of FIG. 3 and halftone matrix values for halftone elements in a corresponding location. The mapping shows kernel values in the top row, halftone matrix values in the middle row and pixel/element locations in the bottom row. For example, the rightmost column is representative of a pixel and a halftone element at location 3-3 (3 across and 3 up form at origin at bottom left of the kernel or halftone matrix). This pixel has kernel value 6 and the corresponding halftone matrix element has a halftone matrix value of 49. Four of the pixels have kernel values of 5, and these are randomly mapped to a halftone matrix value within a range (45-48) of halftone values so that each halftone matrix element corresponding to these pixel locations has a different halftone matrix value. The range of halftone matrix values (45-48) used still corresponds with the kernel value (5) as these are larger in magnitude that halftone matrix values mapped to smaller kernel values—for example kernel values 4 are mapped to a range of halftone matrix values having an upper limit of 44. The allocation of these halftone matrix values can be seen in FIG. 6 which corresponds to the starting kernel of FIG. 3 but modified to have a uniform distribution of values. Only some halftone matrix values are shown in FIG. 6, those corresponding to the partial mapping shown in FIG. 5, however it will be appreciated that all elements of the matrix will be associated with a value.

In the above example, a range of halftone matrix values 0-49 is used to correspond with the 49 pixels in the 7×7 kernel. In other words, each halftone matrix element has one halftone matrix value from this range, where these are selected randomly in some cases—when there are a plurality of pixels sharing the same kernel value. This provides a halftone matrix which has a random and uniform distribution of values as required for PARAWACS applications. The particular values used in the example are for simplicity of explanation and other options are possible, for example a normalized scale of kernel values may be mapped to an 8-bit tone scale (0-255) in a halftone matrix.

Another example of generating a halftone matrix such as a PARAWACS matrix is described below. A starting 6×6 kernel in matrix form is:

```
−0.8   0.2   0.6   0.2  −0.8  −0.9
 0.2   0.8   0.9   0.8   0.2  −0.6
 0.6   0.9   1.0   0.9   0.6   0.2
 0.2   0.8   0.9   0.8   0.2  −0.6
−0.8   0.2   0.6   0.2  −0.8  −0.9
−0.9  −0.6   0.2  −0.6  −0.9  −1.0
```

It can be seen that this kernel matrix comprises pixels or elements which share the same value—in this case a magnitude normalized to the medium intensity. A PARAWACS matrix generated using the above described mapping is:

```
 7  17  25  13   6   2
15  28  34  29  19  12
23  32  35  31  26  18
16  27  33  30  14  11
 8  22  24  21   5   3
 1   9  20  10   4   0
```

It can be seen that this halftone matrix has a uniform distribution of values across the elements, with none repeated, whilst still approximating the original kernel. The distribution is also randomized such that even where the same starting kernel is used, a different halftone matrix but still having uniform distribution will be generated each time.

Figure 7:
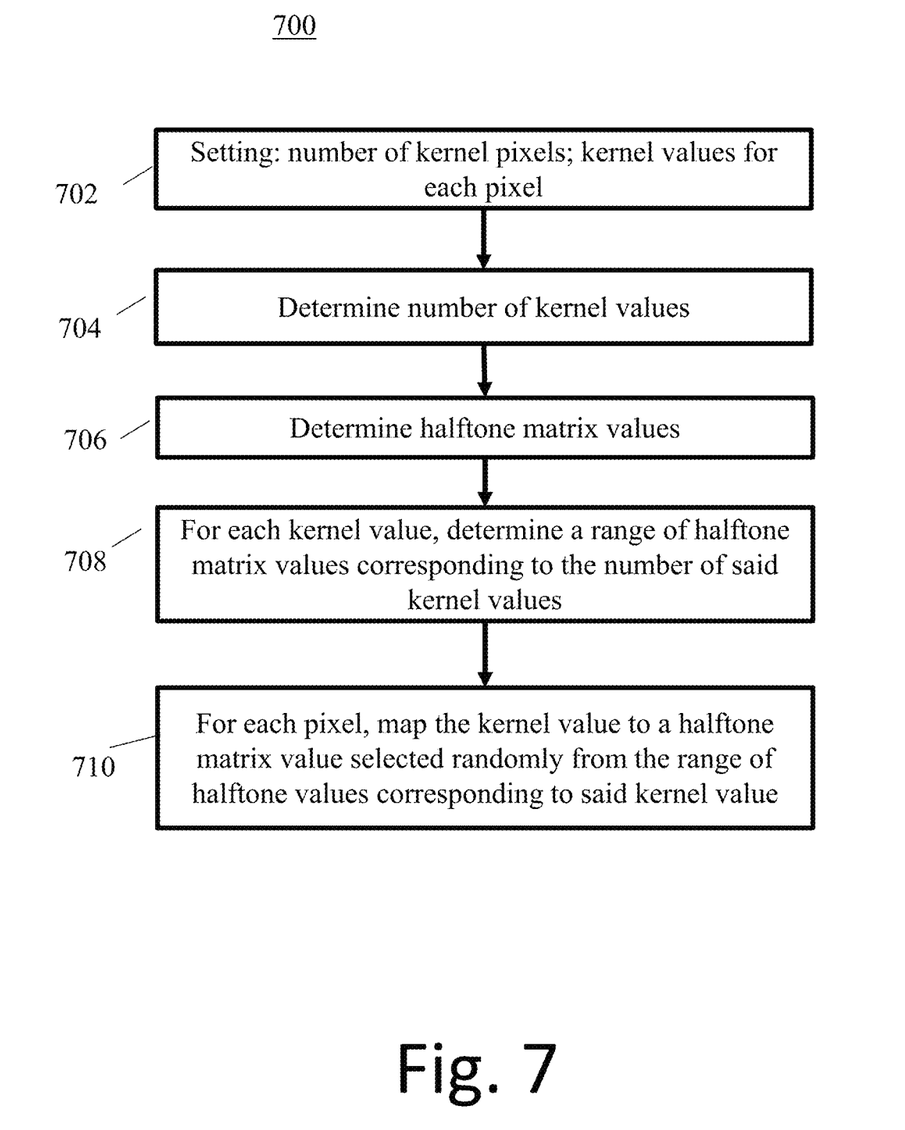
FIG. 7 shows an example method for mapping kernel values to halftone matrix values.

FIG. 7 illustrates an example method of mapping kernel values of a geometric kernel to halftone matrix values of a halftone matrix. At 702, the method sets or receives various parameters including: the number of kernel pixels and their respective kernel values. These parameters correspond to the geometric kernel that is used to generate the halftone matrix, and may be stored in memory or received from an external source. The properties or parameters of the geometric kernel selected may be based on the type of image to be printed and/or printing considerations such as robustness to printing system variation (e.g., print head alignment or substrate advance errors) or imperfect operation (e.g., non-functioning nozzles in an inkjet system) and the need for fine detail.

At 704, the method determines the number of kernel values used. In the above example of FIG. 3, seven kernel values (0-6) where used and there were 49 pixels. At 706, the method determines the halftone matrix values. In the simple example above, this may be achieved simply by multiplying the number of kernel pixels with the number of kernel values to achieve the range of halftone matrix values 0-49.

At 708, the method determines ranges of halftone matrix values corresponding to each kernel value. These can be based on magnitude, with the range of halftone matrix values being non-overlapping with the range of halftone matrix values corresponding to another kernel value. In the above example these may be: kernel value 6→halftone matrix values 49; 5→45-48; 4→37-44; etc. In this example the halftone matrix values are contiguous but those selected for use in the mapping need not be.

At 710, the method maps the kernel value of each pixel to a halftone matrix value. This is achieved by randomly selecting from the range of halftone matrix values associated with the kernel value. A counter associated with the halftone matrix value may be incremented so that it is not randomly selected again and instead a different halftone matrix value is selected from the range when a pixel having the same kernel value is mapped to this halftone matrix range.

Returning to FIG. 2, the method 100 applies 140 the generated halftone matrix to image data to generate a halftone pattern. In the example printing device 10 of FIG. 1, the image data is that output by the color mapping module 36. The image data may comprise a NPac vector per image pixel.

In the example printing device 10 of FIG. 1, the generated halftone matrix 39 is stored in the storage medium 32. Each element of the halftone matrix comprises one of a set of values. For example, the halftone matrix may comprise 8-bit values, in which case each element comprises a value of between 0 and 255. Such a halftone matrix may comprise a 16×16 halftone matrix where each value occurs once. In another example, the halftone matrix may comprise 12-bit values, in which case each element comprises a value of between 0 and 4095, and a 64×64 bit halftone matrix may be provided where each value occurs once. The or each halftone matrix is generated from the starting geometric kernel and subsequently stored, even if temporally, for applying to image data.

Figure 8:
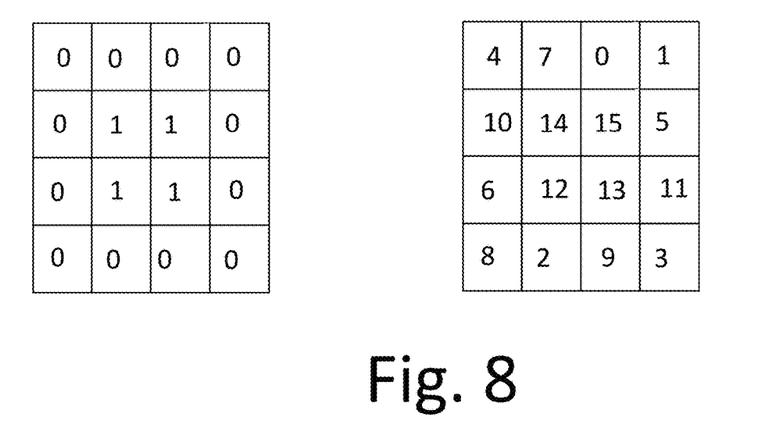
FIG. 8 illustrates generating a halftone matrix from a geometric kernel.
Figure 9:
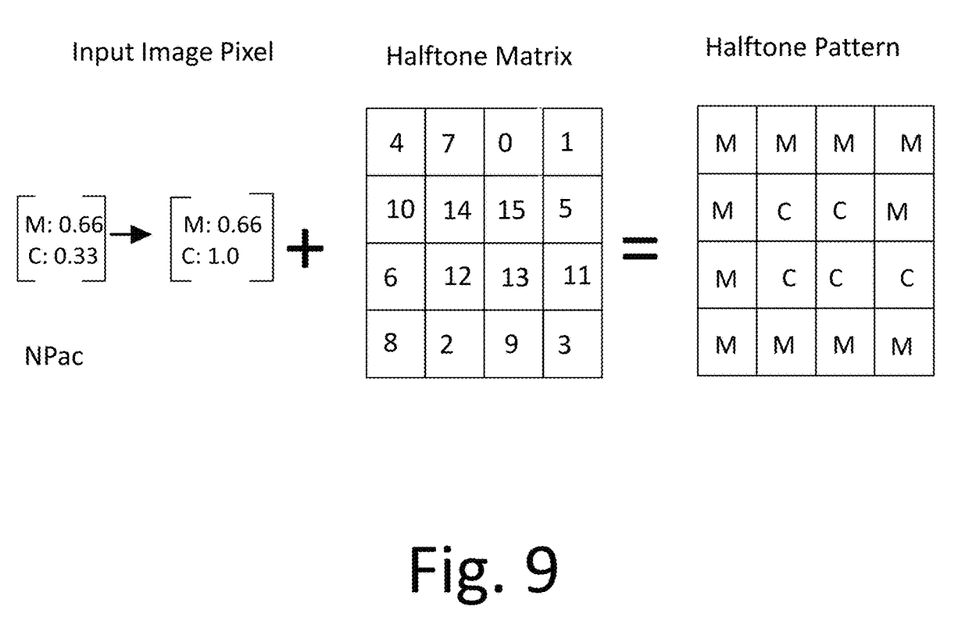
FIG. 9 illustrates applying a halftone matrix to image data.

FIGS. 8 and 9 illustrate the application of a generated halftone matrix to image data. FIG. 8 illustrates a simple geometric kernel of the left, having a dark square surrounded by a light ring. The figure on the right illustrates a halftone matrix generated using the method and starting with the kernel on the left. This halftone matrix is applied to image data in the form of an example NPac vector [M:0.75 C:0.25] having just two NP, with magenta M to form 67% coverage of the halftone pattern and cyan C to form 33% of the coverage.

The NPac vector may represent one of a number of image pixels of the image data and the halftone matrix is used to "half tone" the image pixel to generate a halftone pattern each having a plurality of halftone pixels. A different halftone matrix may be used for each NPac vector or other data associated with an input image pixel. Each half tone pixel is associated with an NP such that the combination of half tone pixels in the half tone pattern results in NP coverage according to the NPac vector. A different halftone matrix may be used for each NPac vector, for example to avoid visual artefacts such as moire. These different halftone matrices may be generated from the same starting geometric kernel but because of the randomized mapping process halftone matrices for adjacent or sequential image data will be different.

Each NP of the NPac vector is allocated a range halftone matrix values in proportion to its coverage area defined in the NPac. In an example, magenta M may be allocated halftone matrix values from 0-10 (67%) and cyan C may be allocated halftone matrix values 11-15 (33%). Then either M or C is allocated to each pixel of the halftone pattern depending on the value of the halftone matrix. For example, if this value falls within the range 0-10 then M is allocated to the corresponding halftone pixel in the halftone image. It can be seen from FIG. 9 that the halftone pattern still resembles the original geometric kernel of FIG. 8, with a cyan square and magenta ring, but with some randomness introduced by the additional cyan on the lower right.

Other halftone patterns generated using the same NPac and same starting kernel but different randomly generated halftone matrix may have subtle changes such as an extra cyan pixel in a different outer location or a magenta pixel in one of the inner pixels. Therefore even if there are a sequence of the same NPac in the image data, adjacent halftone patterns will be slightly different thereby avoiding visual artifacts such as moire.

Returning again to FIG. 2, the method 100 comprises printing 150 the halftone patterns. Each of the halftone patterns may be printed in the same or a different printing pass and/or with the same of a different set of printheads.

In another example, the starting geometric kernel may be modified before mapping to the halftone matrix. Some geometric kernels may have a skew towards lower values which may be improved by removing some of their rows or columns of pixels. This may reduce lack of uniformity in the kernel which in turn improves the distribution of values in the eventually generated halftone matrix. For example, in the kernel of FIG. 3, the first row and column of pixels may be removed to reduce the skew towards lower values.

In another example, halftone patterns may be tiled together for each input data such as an NPac vector in order to further improve uniformity and randomness of a PARAWACS matrix. In other words, the halftone patterns are tiled together to form a super halftone pattern for each image pixel. The super halftone pattern is generated by applying different randomly generated halftone matrices to the same NPac vector or other image data. An example of this approach is shown in FIGS. 10 and 11.

Figure 10:
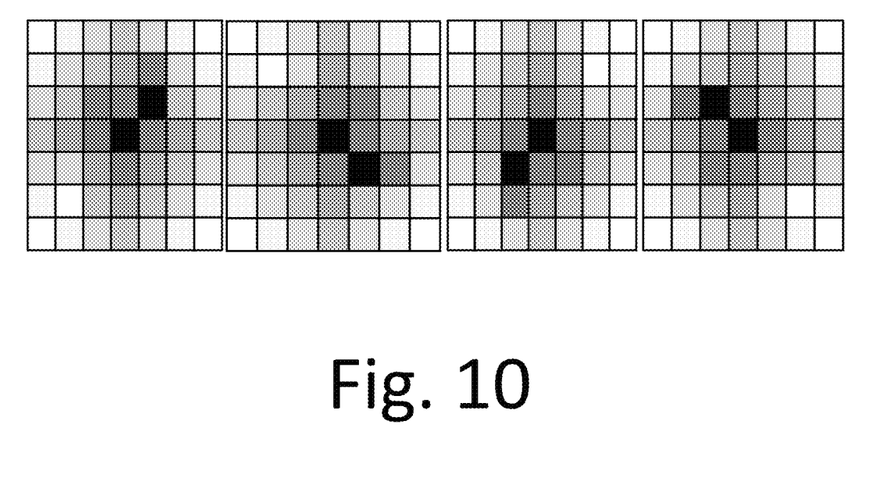
FIG. 10 illustrates tiling halftone patterns generated by randomly generated halftone matrices.

FIG. 10 illustrates a number of halftone matrices generated from the same geometric kernel. As can be seen these have differences in their distribution of values. Each of these halftone matrices may then be applied to the same NPac vector to generate a series of different halftone patterns that are used to render that image pixel. FIG. 11 illustrates schematically a super PARAWACS matrix in which each square or cell represents a halftone matrix randomly generated from the same geometric kernel, each halftone matrix having a different distribution of values. This results in a pleasing visual appearance and a halftone pattern that has both macro-regularity and micro-randomness.

Figure 12:
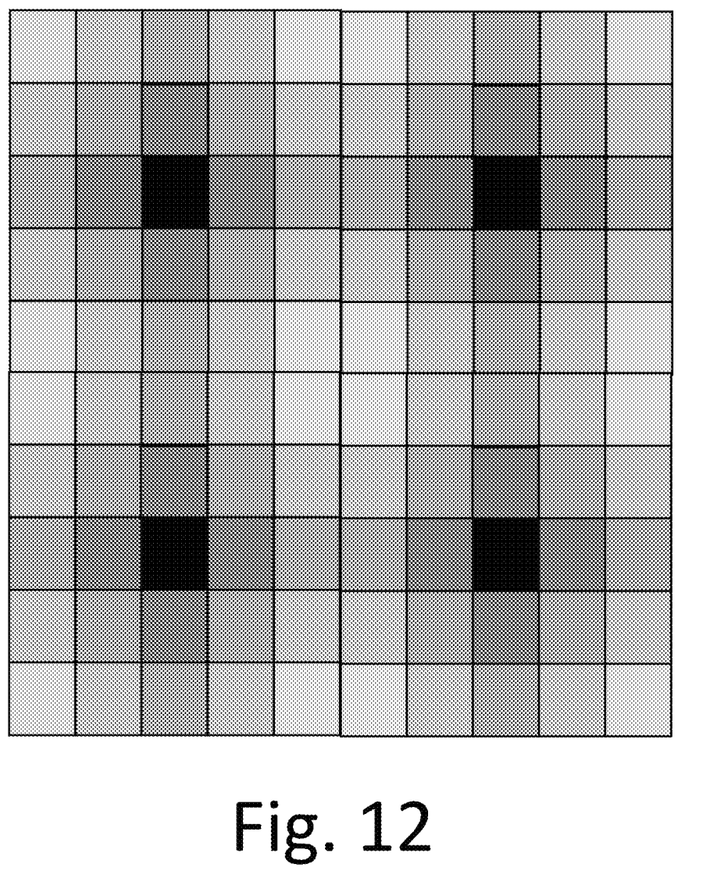
FIG. 12 shows a super-kernel.

An alternative approach to generating a super halftone matrix or pattern is to start with a super kernel such as that shown in FIG. 12. This example has a 4×4 super kernel with each kernel being the same. In this example the kernel is that of FIG. 3 but with the outer rows and columns of pixels removed. In this example, the mapping and hence randomness is performed across the entire super kernel and therefore increases the number of values used in the generated halftone matrix. For example, compared with using only one kernel which has a central pixel with value 6, the super kernel has four pixels with value 6, and a corresponding greater number of the other values. A greater number of halftone matrix values are required to enable one to many mapping from each kernel value to many halftone matrix values to ensure uniformity of those halftone matrix values across the elements of the halftone matrix.

Figure 11:
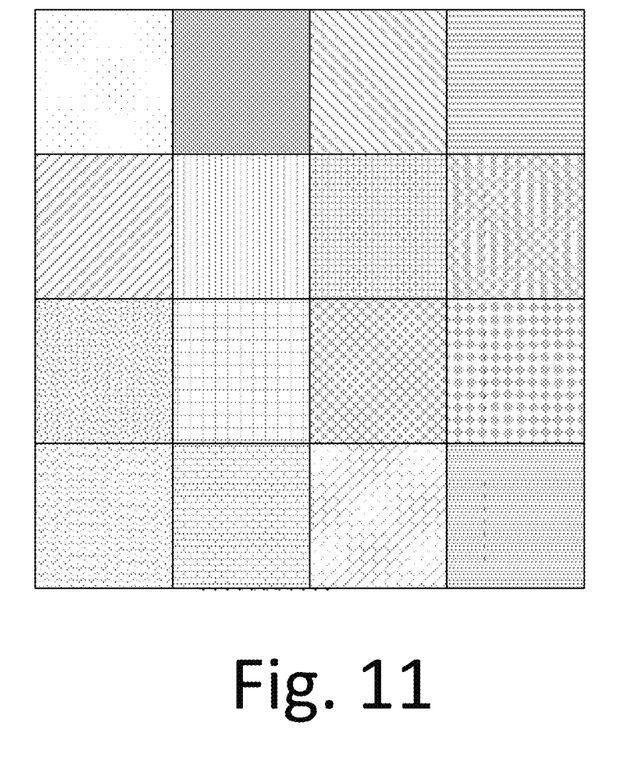
FIG. 11 shows a super PARAWACS matrix.

For example a 5×5 halftone matrix generated from a 5×5 kernel will use 25 halftone matrix values in the example of FIGS. 10 and 11 where each halftone pattern is tiled with another generated from the same kernel. However, using the approach of FIG. 12, there are four 5×5 kernels tiled together and therefore a 10×10 halftone matrix is needed. This allows for mapping to 100 unique values, four times that of the halftone matrices of FIGS. 10 and 11.

Further combinations and variations are possible. For example a number of halftone patterns may be generated from the same super kernel and which are then tiled together as a super-halftone matrix. This may then be used to generate even more random halftone patterns whilst maintaining uniform value distribution.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
providing a kernel having a plurality of pixels each having a kernel value;
generating a halftone matrix by mapping the kernel value of each pixel to a halftone matrix value at a corresponding element of the halftone matrix;
wherein a plurality of pixels having the same kernel value have said kernel value randomly mapped to a respective halftone matrix value in a range of halftone matrix values corresponding to said kernel value.

2. A method as claimed in claim 1, wherein the mapping is based on the magnitude of the kernel values and the halftone matrix values.

3. A method as claimed in claim 1, wherein the halftone matrix comprises a uniform distribution of halftone matrix values.

4. A method as claimed in claim 1, generating a plurality of halftone matrices wherein the mapping between kernel values of each pixel and a halftone matrix value are different.

5. A method as claimed in claim 1, wherein the kernel comprises pixels having kernel values that are distributed geometrically based on magnitude.

6. A method as claimed in claim 5, wherein the geometric kernel comprises a plurality of common geometric sub-kernels.

7. A method as claimed in claim 1, comprising providing image data to be printed and applying the halftone matrix to the image data to generate a plurality of halftone patterns.

8. A method as claimed in claim 7, wherein the image data comprises a Neugebauer Primary area coverage (NPac) vector, and applying the halftone matrix to the image data comprises assigning a Neugebauer Primary (NP) to each pixel of the halftone pattern according to the NPac vector and the value of the corresponding element of the halftone matrix.

9. A method according to claim 1, wherein the halftone matrix is a PARAWACS matrix.

10. A method as claimed in claim 1, comprising removing some pixels from the kernel before generating the halftone matrix.

11. A printing device comprising:
a printhead assembly;
a processor; and
a storage medium storing a kernel having a plurality of pixels each having a kernel value, and instructions for execution by the processor;
wherein the instructions, when executed by the processor, cause the processor to:
generate a halftone matrix by mapping the kernel value of each pixel to a halftone matrix value at a corresponding element of the halftone matrix;
wherein the mapping is according to respective magnitudes of the kernel values and halftone matrix values and wherein a plurality of pixels having the same kernel value magnitude are randomly mapped to a respective one halftone matrix value in a corresponding range of halftone matrix value magnitudes.

12. A printing device as claimed in claim 11, wherein the instructions, when executed by the processor, cause the processor to:
provide image data to be printed; and
apply the halftone matrix to the image data to generate a plurality of halftone patterns.

13. A printing device as claimed in claim 12, wherein the instructions, when executed by the processor, cause the processor to:
print the halftone patterns using the printhead assembly.

14. A non-transitory computer-readable storage medium comprising a set of computer-readable instructions that, when executed by a processor, cause the processor to:
provide a kernel having a plurality of pixels each having a kernel value;
generate a halftone matrix by mapping the kernel value of each pixel to a halftone matrix value at a corresponding element of the halftone matrix;
wherein the mapping comprises for each pixel mapping the kernel value magnitude to a halftone matrix value magnitude selected randomly from a range of halftone value magnitudes corresponding to the kernel value magnitude of the pixel.

15. A non-transitory computer-readable storage medium as claimed in claim 14, the set of computer-readable instructions that, when executed on a processor, cause the processor to:
applying the halftone matrix to image data to generate a plurality of halftone patterns.

* * * * *